United States Patent [19]

Peppel

[11] Patent Number: 4,670,830
[45] Date of Patent: Jun. 2, 1987

[54] METHOD AND APPARATUS FOR THE PROTECTION OF CONVERTER EQUIPMENT WITH GTO THYRISTORS AGAINST SHORT CIRCUIT

[75] Inventor: Joerg-Michael Peppel, Konigstein, Fed. Rep. of Germany

[73] Assignee: Siemens Aktiengesellschaft, Munich, Fed. Rep. of Germany

[21] Appl. No.: 696,073

[22] Filed: Jan. 29, 1985

[30] Foreign Application Priority Data

Feb. 17, 1984 [DE] Fed. Rep. of Germany ....... 3405793

[51] Int. Cl.⁴ ........................................... H02H 7/122
[52] U.S. Cl. ..................................... 363/57; 363/135; 361/57; 361/100
[58] Field of Search ............ 363/57, 58, 124, 135–138; 361/54, 57, 63, 87, 94, 100

[56] References Cited

U.S. PATENT DOCUMENTS 3,444,453 5/1969 Peterson .
3,569,819 3/1971 Martzloff .............................. 363/58
3,916,287 10/1975 Brenneisen et al. ................. 363/57
3,947,748 3/1976 Klein .................................... 363/57
4,346,421 8/1982 Gurr ..................................... 361/57

FOREIGN PATENT DOCUMENTS 0562892 10/1977 U.S.S.R. ............................... 363/57

OTHER PUBLICATIONS

G. L. Campen, et al., Voltage Protection Scheme for MG Sets Used to Drive Inductive Energy Storage Systems, pp. 1079–1081, Oct. 1977.

Primary Examiner—Peter S. Wong
Attorney, Agent, or Firm—Kenyon & Kenyon

[57] ABSTRACT

In order to protect converter equipment which includes GTO switching-off thyristors and having d-c inputs and a protective inductance connected in series therewith against short circuit currents, a short circuit path for d-c current flowing from a d-c supply source on the one hand, and on the other hand, an energy storage device, is inserted into the d-c circuit, closed via an auxiliary thyristor, of the converter equipment in such a manner that through the change of the state of storage of the energy storage device, a countervoltage is impressed on the d-c terminals, which leads to the forcible commutation of the switching-off thyristors. The energy storage device advantageously comprises an auxiliary winding of a limiting choke serving as a protective inductance. The fault current, which increases steeply in the event of a short circuit via the protective inductance and the auxiliary thyristor, causes, due to the magnetic coupling, the generation of a counter voltage in the supplemental winding required for forcible commutation of the switching-off thyristors. For monitoring the current and for generating the auxiliary thyristor firing energy, a monitor likewise fed inductively by means of the protective inductance may be provided.

7 Claims, 4 Drawing Figures

METHOD AND APPARATUS FOR THE PROTECTION OF CONVERTER EQUIPMENT WITH GTO THYRISTORS AGAINST SHORT CIRCUIT

BACKGROUND OF THE INVENTION

The present invention relates to a method of shorting the d-c terminals of converter equipment connected to a d-c source with gate turn-off (GTO) thyristors in the event of short-circuit-related overcurrents. The invention relates also to apparatus for carrying out the method.

In order to provide a background to the present invention, reference is now made to FIG. 1.

FIG. 1 shows, as an example of a GTO-equipped converter equipment, an inverter 1, in the d-c leads 2 and 3 of which, series-connected inductances 4 and 5 and a shunt capacitor 6 indicate that the valve branches participating in carrying the d-c current and their load relief circuits contain capacities and inductances for instance, stray capacitances and inductances. Connected in series with the d-c terminals can also be separate capacitors or inductances, for instance, in order to achieve smoothing of the input d-c voltage or the input d-c current. A short circuit or short to ground in the converter equipment 1 leads to a fault current which increases steeply and suddenly, and which can lead to the destruction of the thyristors. Due to the low current-pulse resistance of gate turn-off thyristors (GTO thyristors), measures must be taken particularly in GTO-equipped converters in order to protect the converter equipment against destruction by shutting it off.

For this purpose, protective inductances 7 and 8 can be used which are arranged in the d-c circuit and are usually provided for limiting the rise of the d-c current during commutations or, if a GTO is used, to protect the latter while the d-c voltage is switched on.

If only chokes 7, 8 are used for protecting the GTO, they must be made unnecessarily large since a GTO in principle has a relatively long turn-off delay time of several microseconds, so that the fault current does not increase within this delay time to values which can no longer be interrupted by the GTO.

For this reason, conventional safety devices, for instance, fuses 9, 10 or fast-action switches are provided as a rule also in GTO-equipped converter equipment, which switch off the converter equipment without switching off the GTO thyristors. These fuses are arranged between the feeding d-c source (indicated by a capacitor 11, for instance, the smoothing capacitor of an intermediate voltage link) and the protective inductances 7 and 8.

If overdesign of the chokes 7 and 8 is dispensed with, the lower current-carrying capacity of switching-off thyristors requires further measures for short circuit protection. For this purpose, a short-circuit path is provided in FIG. 1 between the d-c inputs of the equipment 1 which can be closed via an auxiliary thyristor 12 when an overcurrent due to a short circuit occurs, where the firing command for the auxiliary thyristor 12 is furnished by a monitoring device 13 connected to the d-c voltage source. This auxiliary thyristor 12 then takes over the major part of the fault current in the event of a short circuit.

With this method, a substantially smaller protective inductance is sufficient because the conventional thyristor can be used as the auxiliary thyristor which can only be switched on and has a substantially shorter switching-on delay time and greater current-carrying capacity than a GTO. However, difficulties arise with such a circuit for dividing the current over the original current path leading through the shutting-off thyristors of equipment 1 and the short circuit path leading via the auxiliary thyristor 12. This division of the current over two parallel branches which are practically free of resistance is determined essentially only by the stray inductances and the voltage drops of the semiconductors connected in these branches. Since the auxiliary thyristor short-circuits not only the voltage source 11, but also the d-c circuit in the interior of the equipment 1, only a slightly attenuated d-c current comes about in the equipment 1 which easily can increase for several hundred microseconds to values which can no longer be switched off by the GTO. If within this time, a switch-off command is given to the GTO by the control unit of the equipment 1, the destruction of the former must be expected.

In order to obtain effective short-circuit current protection, it appears to be necessary in the arrangement according to FIG. 1 to improve, on the one hand, the current division through appropriate design of the stray inductances 4, 5 or by separate series inductances, or on the other hand, to suppress by separate intervention into the control all switching-off pulses for the thyristor in the event of a short circuit. This means, on the one hand, an intervention into the control cycle and on the other hand, circuit changes in the design of the equipment 1 and the associated controls.

SUMMARY OF THE INVENTION

It is an object of the present invention to protect GTO-equipped converter equipment, particularly an inverter or a d-c control element, which is protected against destruction by short circuit-related overcurrents. It is particularly advantageous that the apparatus and method according to the invention can be realized by a device connected in series with the customary converter without further intervention into the converter and its control unit.

The above and other objects of the present invention are achieved by a method for short-circuiting d-c input terminals of converter apparatus coupled to a d-c source in the event of short circuit-related overcurrents, the converter apparatus having at least one gate turn off thyristor, comprising closing a short circuit-path between the d-c inputs and applying a countervoltage to the d-c input terminals of the apparatus upon closing the short circuit path.

BRIEF DESCRIPTION OF THE DRAWINGS

The invention will be explained in greater detail in the following detailed description with reference to the drawing figures in which:

FIG. 1 shows a circuit arrangement illustrating the prior art methods of protecting GTO-equipped apparatus;

FIG. 2 shows a circuit arrangement conceptually illustrating invention, applied to a d-c control element.

DETAILED DESCRIPTION

Figures 1, 2:
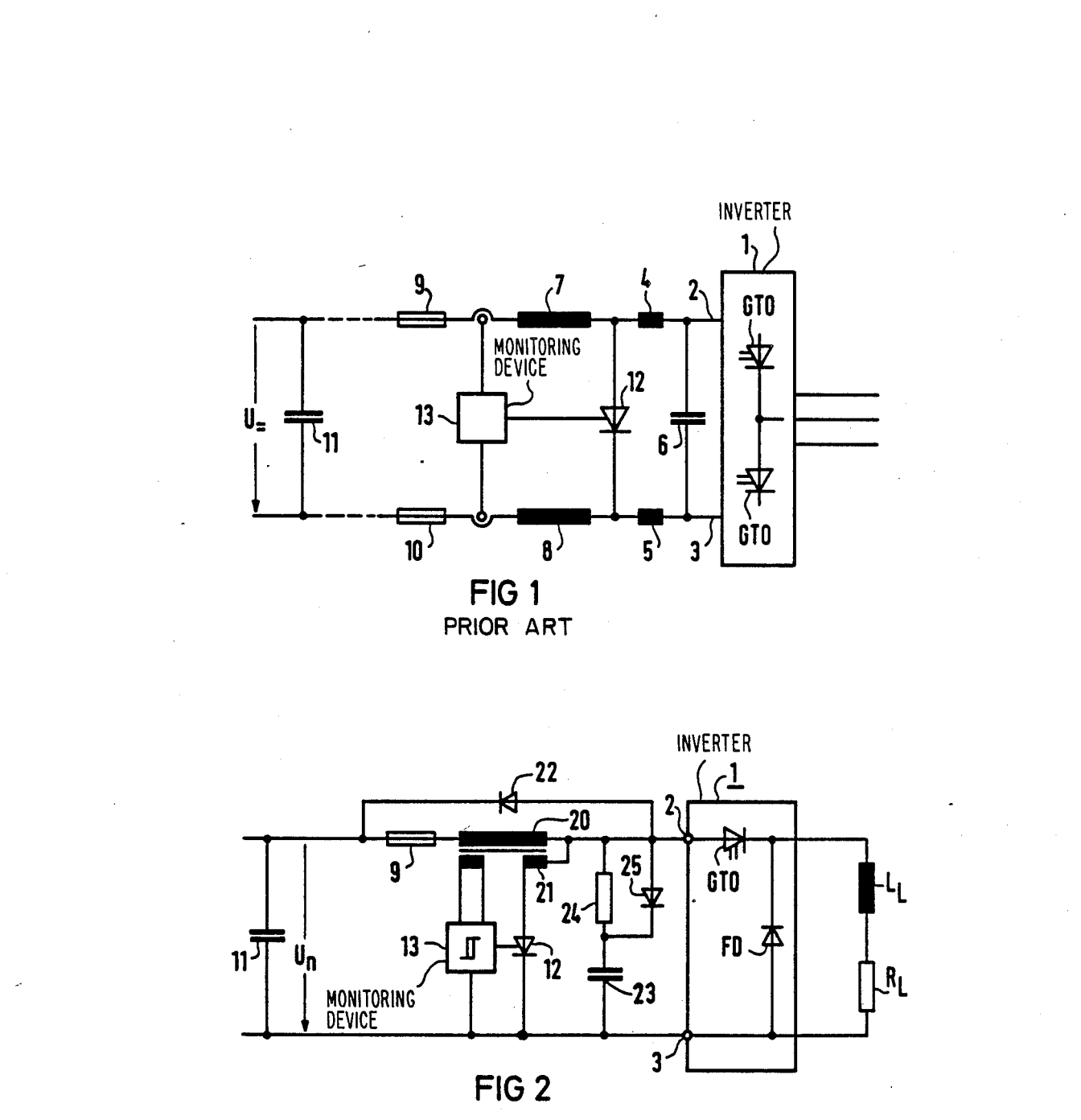
Figure 3:
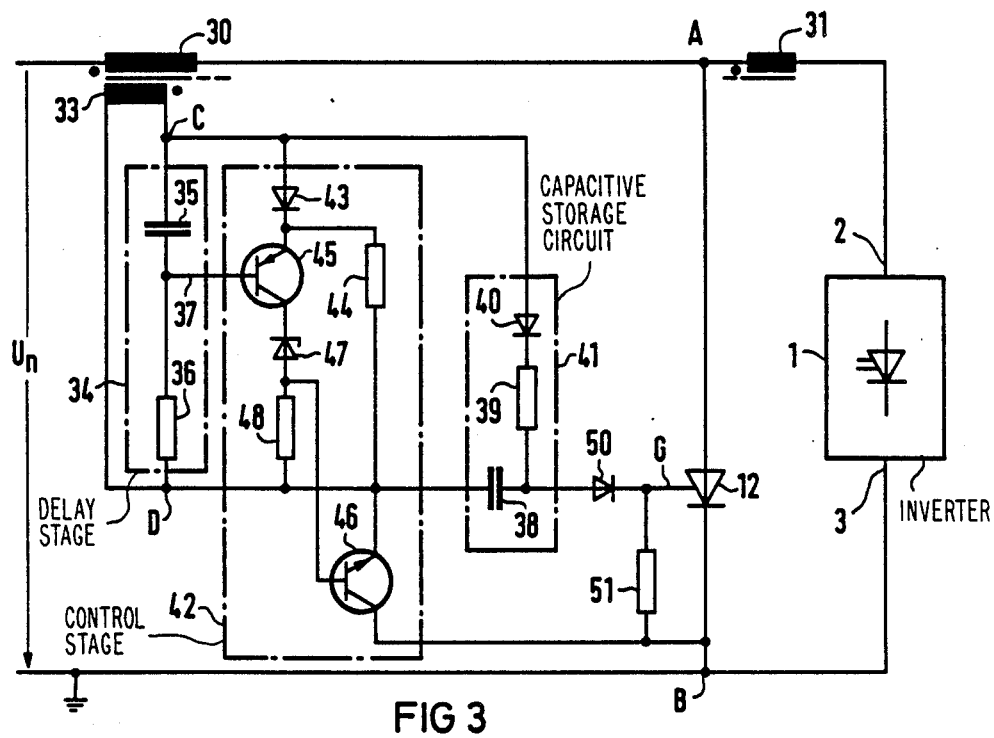
FIGS. 3 and 4, show circuit arrangements for protective circuits according to the invention for an inverter.

With reference now to FIG. 2, a d-c control element is shown by the GTO equipped apparatus 1 which is arranged in the d-c circuit and can be switched off (therefore, a turn-off thyristor GTO acting as the main thyristor, with a by-pass diode FD for the load current connected thereto), where the load current is conducted through a load shown as a load inductance $L_L$ and a load resistor $R_L$. The d-c terminals of the equipment 1 are designated by 2 and 3 and are connected via a protective inductance 20 to the d-c current source (including capacitor 11) with the d-c input voltage $U_n$. Upon the occurrence of an overcurrent due to a short circuit, which is detected by the monitoring device 13, the auxiliary thyristor 12 is fired which closes a short-circuit path for the d-c current of the d-c voltage source containing the protective inductance 20.

According to the invention, a countervoltage is applied to the d-c current inputs 2, 3 of the equipment if an overcurrent occurs. It is achieved thereby that the GTO is extinguished independently of the occurence of a switching-off command, and the load current is of necessity commutated from the GTO to the bypass diode FD. For this purpose, an energy storage device is provided in the d-c current circuit of the equipment 1, which can be shorted by the auxiliary thyristor. The state of charge of the energy storage device is changed if the auxiliary thyristor is fired and thereby generates a countervoltage at the d-c voltage terminals of the equipment.

Advantageously, the counter voltage is impressed inductively on the d-c inputs. The countervoltage can be obtained inductively from the short-circuit path of the d-c source. This is achieved in FIG. 2 by the provision that a supplemental inductance 21 is used as the energy storage device which is coupled magnetically to the protective inductance 20. The supplemental inductance 21 is therefore practically an auxiliary winding for the protective inductance 20 designed as a short circuit current-limiting choke.

If it now happens due to a short to ground in the converter equipment 1 or in the load circuit that practically the entire voltage $U_n$ drops at the choke 20, the current through this choke increases exponentially. The firing of the auxiliary thyristor 12 therefore closes a short-circuit path 9, 20, 21, 12 for the d-c source 11, whereby the storage device 21 is charged. The charging takes place by the fault current itself and causes the terminal 2 to be inductively at negative potential relative to the terminal 3 of the equipment. The current can be monitored by the provision that the monitor 13 is fed inductively directly from the short-circuit path via a secondary winding of the choke 20 and therefore, the firing energy for the auxiliary thyristor 12 is likewise taken from the fault current.

It is further provided in the device according to FIG. 2 that the protective inductance 20 and, optionally, the conventional protective device 9 are shunted via an antiparallel diode 22 so that no overvoltages can be generated in the feeding d-c current by a-c current components which also are present in the undisturbed operation of the equipment 1.

Converter apparatus equipped with GTO thyristors generally have thyristor relief circuits which are not shown in detail in the block diagram of the figures. So that the charge reversal currents of these relief circuits which might occur, do not flow through the limiting chokes 20 and thereby increase, on the one hand, the losses but on the other hand make the detection of short circuits more difficult, a parallel support (clamping) capacitor 23 is arranged between the inputs 2, 3. The latter, however, must likewise reverse its charge in the event of a fault so that the capacitor energy transferred does not flow via the thyristors and be spent there, heating up the thyristors. A discharge resistor 24 is arranged in series with the capacitor 23 but is short-circuited for the mentioned charge reversal currents by the shunt diode 25.

In the embodiment according to FIG. 2, the auxiliary winding 21 is arranged in series with the auxiliary thyristor 12 and in shunt with the terminals 2 and 3. This, however, is by no means required. FIG. 3 shows a preferred different design of the limiting choke, the protective inductance and the supplemental inductance. The protective inductance is designed therein as a choke with a tap, where the tap represents the connecting point of the auxiliary thyristor 12 forming the short-circuit path and the winding portion arranged downstream in the direction of the d-c current flowing from the d-c source is connected to the d-c terminal 2. Normally, the operating d-c current flows through this winding portion in the same direction as the winding portion 30 (protective inductance) and is charged as a magnetic energy storage device through magnetization. If the auxiliary thyristor 12 is fired in the event of a disturbance, a voltage no longer exists, in the ideal case, between points A and B of the short circuit path. The fault current therefore can not increase further in the equipment 1. This, however, does not occur in reality because of the unavoidable parasitic inductance between these points. However, the magnetic coupling of the winding portions 30 and 31 has the effect that the winding portion 31 is charged still further by the rising fault current in the inductor 30, and, in the d-c circuit which is formed by the corresponding d-c path in the equipment 1, the auxiliary inductance 31 and the auxiliary thyristor 12, a negative voltage is induced which exceeds the parasitic voltage drop in the short circuit path. Thus, the driving voltage between terminals 2 and 3 is reversed; within a few microseconds, the fault current in the equipment is broken up and subsequently, all thyristors of the equipment 1 are forcibly commutated. In the event of a short circuit, the equipment 1 is therefore loaded very little.

The inductances 30 and 31 and the coupling between them are advantageously designed, according to the requirements of the equipment, in such a manner that the induced voltage is about 10 V, which is entirely sufficient as a rule for forcibly commutating the GTOs. Higher voltages only have the effect that an unnecessarily large countercurrent flows via the bypass diodes of the equipment. On the other hand, the inductances 30 and 31 must ensure sufficient current rise limitation of the equipment thyristors in the normal case as well as sufficient protection for the auxiliary thyristor 12 in the event of a short circuit, i.e., the inductance of the entire choke which acts on the auxiliary thyristor after the latter has been fired must not be too small. In addition, the increase of the short-circuit current during the unavoidable delay between the occurrence of the short circuit and the firing of the auxiliary thyristor must not become dangerous to the turn-off thyristors of the equipment 1. As a rule, it is sufficient to lead the d-c connection 2 with one or a few turns around the core of the choke after the branch for the auxiliary thyristor 12.

FIG. 3 further shows an advantageous embodiment of the monitoring device 13. The supply current of this monitoring device is taken off at a secondary winding 33 of the limiting choke 30. The winding sense of the secondary winding 33 is reversed, so that the input C of the control and monitoring device 13 is at a potential positive relative to the input D as long as the a-c component in the operating d-c current is small in normal operation. The control and monitoring device 13 comprises on the one hand, a delay stage 34 for the supply voltage, which contains a capacitor 35 which can be charged by the current between C and D and which has an integrating effect on the supply voltage and with which a resistor 36 is connected in series, through which the capacitor is discharged with a proper discharge characteristic. At the tap 37 between the capacitor and the resistor, a value of the supply voltage is therefore present which is delayed by the transfer function of a first-order delay stage. The apparatus further contains a capacitive storage circuit 41 with a storage capacitor 38 which is charged by the supply voltage at the inputs D and C via a resistor 39 and a diode 40.

The terminals C and D further feed a control stage 42 with a series circuit comprising a further diode 43 and a resistor 44. Since in normal operation the supply voltage is low and practically corresponds to the delayed voltage present at the tap 37, a transistor 45 contained in the control unit 42 is cut off and causes simultaneously the cutting-off of a further transistor 46, by which, in the fired condition, the storage capacitor 38 is switched into a discharge circuit which leads via the control path G-B of the auxiliary thyristor and feeds firing current to the latter by discharging the storage capacitor 38. Thyristor 12 is wired in the usual manner to a control current diode 50 and a protective resistor 51.

In the event of a short circuit or short to ground in the converter equipment 1, practically the entire supply voltage $U_n$ is present at the coil 30, through which the steeply increasing fault current flows (with the exception of a relatively small inductive voltage drop at the supplementary inductance 31). As a result, the supply voltage between the control inputs C and D increases and, according to the characteristic of the delay stage 34, the base of the transistor 45 is addressed by increasing potential. The transistor 45 carries current at the earliest after a delay time given by the delay stage 34. If at this point in time a still sufficiently large control voltage exists between the points C and D, the Zener diode 47 located together with a series resistor 48 in the main circuit of the transistor 45 breaks down and supplies the base current for switching the transistor 46 into conduction. The storage capacitor 38 is therefore discharged via the diode 50 to the gate G of the auxiliary thyristor 12. If, on the other hand, the voltage between the inputs C and D has already decayed again, after the mentioned delay time, to the point that the Zener diode 47 is cut off, the transistor 46 remains cut off and no firing takes place.

The control unit 42 causes the firing of the auxiliary thyristor 12 only in the simultaneous presence of two conditions, namely, a sufficiently large supply voltage which is above the breakdown voltage of the Zener diode 47 and corresponds to a large over current such as occurs practically only in the event of short circuits of the equipment 1 as well as a duration extending over the delay time of the delay stage 34 of the overcurrent-related voltage rise, so that brief current spikes such as occur, for instance, with commutations in the equipment 1 do not lead to protective firings of the auxiliary thyristor 12.

With this method and apparatus, it is ensured that a current rise due to a short circuit is prevented largely via the short circuit path of the auxiliary thyristor 12, and the switching-off thyristors of the equipment 1 are not overloaded. Therefore, these thyristors are not threatened by possible damage if a shutting down command is generated by the control during such a short circuit. It is therefore not necessary to intervene into the control circuitry of the equipment 1 itself in the event of a short circuit by means of the monitor 13. This monitor 13, together with the auxiliary thyristor 12 and the inductances 30 and 31 can rather be designed as a separate subassembly which is connected, if necessary, instead of or in addition to the customary current limiting chokes, in series with the d-c terminals of the equipment 1. The cost of this equipment is very small; the most expensive component is, as a rule, the protective inductance itself which is necessary anyhow. As compared with other embodiments, in which the countervoltage is supplied by other energy storage devices, for instance, an external voltage source, a simpler and more cost-effective solution is obtained.

Figure 4:
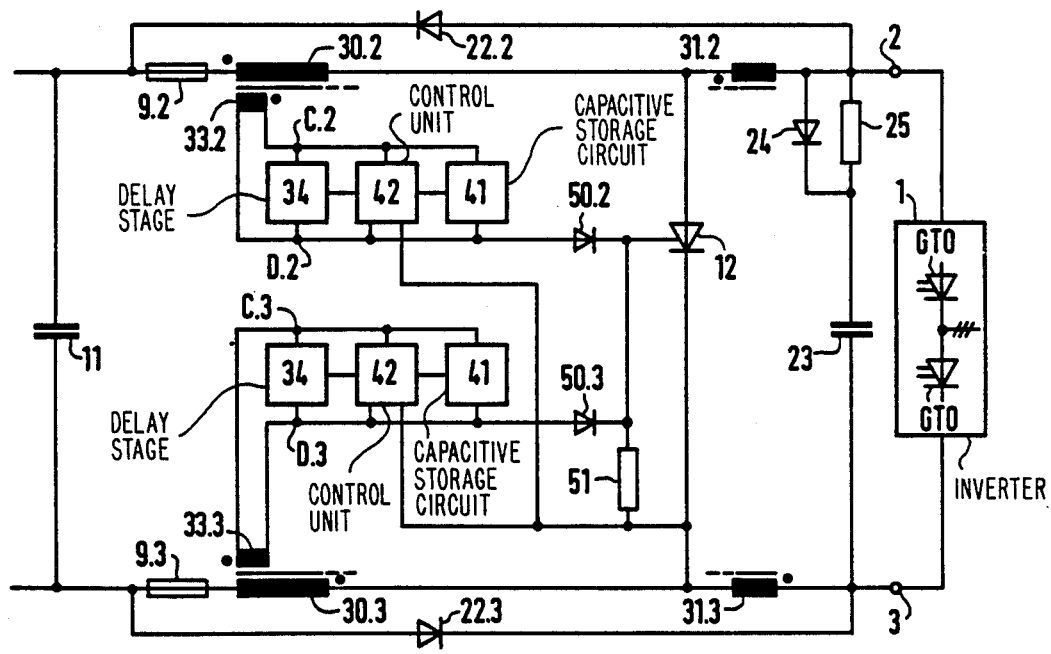

FIG. 4 shows a corresponding series device for the d-c terminals 2, 3 of an inverter, where in this case a short circuit-related overcurrent can occur in the d-c terminal 2, in the d-c terminal 3 or in both terminals, depending on the type of the occurring short circuit or short to ground in the equipment 1. Therefore, there is arranged in each of the two d-c terminals 2 and 3, a suitable protective inductance 30.2 and 30.3 with a supplemental inductance 31.2 and 31.3, respectively, each of which are designed as a choke with a tap for the auxiliary thyristor 12 as a short circuit path. Each of these chokes feeds inductively the inputs to C.2 and D.2 or C.3 and D.3 of a separate monitoring and control device. Due to the winding sense of the secondary winding for the inductive feeding, the input C.3 is more positive than the input D.3 and the monitor associated with the d-c terminal 3 can be constructed from a delay stage 34, a capacitive storage device 41 and a control stage 42 according to FIG. 3. The two control devices are connected via the corresponding diodes 50.2 and 50.3 as well as a protective resistor 51 to the control path of the auxiliary thyristor 12. Likewise, a conventional protective device 9.2 and 9.3, respectively, and an antiparallel diode 22.2 and 22.3 are provided for each terminal 2, 3. The protective circuit is supplemented by the already discussed support or clamping capacitor 23 with the series connected antiparallel circuit comprising resistor 25 and diode 24. This arrangement therefore has the effect that, in the event of a short circuit or a short to ground, the current through the auxiliary thyristor 12 is shorted, a negative voltage for the forcible commutation of the shutting-off thyristors is inductively coupled to the d-c inputs 2, 3 of the equipment 1, and therefore, the d-c current in the equipment 1 is limited and that, finally, the equipment 1 can be switched-off by the response of the conventional protective devices 9.2 and 9.3 upon further increase of the fault current.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A method for short-circuiting d-c input terminals of converter apparatus coupled to a d-c source in the event of short circuit-related overcurrents, the converter apparatus having at least one gate turn off thyristor, comprising closing a short circuit path between the d-c inputs and applying a countervoltage to the d-c input terminals of the apparatus upon closing the short circuit path, the countervoltage being impressed inductively on the d-c input terminals, the countervoltage being generated inductively by the short circuit current of the d-c source, said step of closing a short circuit path comprising firing an auxiliary thyristor via a monitoring and control device fed an inductively generated supply voltage from the current flowing from the d-c source through the short circuit path.

2. The method recited in claim 1 wherein the inductively generated supply voltage of the monitoring and control device is fed to a time delay means, a capacitive storage means and a control means, said capacitive storage means being discharged to a control terminal of the auxiliary thyristor if the inductively generated supply voltage exceeds a predetermined limit for a period predetermined by the time delay means.

3. Apparatus for short-circuiting d-c input terminals of converter equipment coupled to a d-c source in the event of short circuit related overcurrents, said converter equipment having at least one gate turn off thyristor, comprising auxiliary thyristor means coupled across the d-c input terminals for closing a short circuit path for d-c current from the d-c source upon the occurrence of a short circuit-related overcurrent, at least one protective inductance means common to a d-c circuit of the equipment and the short circuit path of the d-c current which can be shorted by the auxiliary thryistor means, the storage state of said storage means being changed by the firing of the auxiliary thyristor means, thereby generating a countervoltage at the d-c input terminals of the converter equipment, the protective inductance means being inductively coupled to supply inputs of a further storage means and a control means, the control means having an output coupled to a control terminal of the auxiliary thyristor means, the further storage means being discharged by a firing signal on the output of the control means to the control terminal of the auxiliary thyristor means, the firing signal being generated by the control means if an inductively generated supply voltage to the control means generated by the current through the protective inductance means exceeds a predetermined limit.

4. The apparatus recited in claim 3, further comprising time delay means, the inductively generated supply voltage being fed to the time delay means from the protective inductance means for delaying the delivery of the firing signal for a period of time corresponding to a time constant of the time delay means after the current through the protective inductance means has increased beyond a predetermined limit.

5. The apparatus recited in claim 3, wherein said energy storage means comprises supplemental inductance means magnetically coupled to the protective inductance means.

6. The apparatus recited in claim 5, wherein the protective inductance means and the supplemental inductance means comprises a current-limiting choke having a tap, said auxiliary thyristor means being connected to the tap.

7. The apparatus recited in claim 6, wherein the current-limiting choke is coupled to further protection means in a series circuit, and further comprising diode means coupled across said series circuit, capacitor means shunted across the d-c input terminals, said capacitor means being coupled to a series-connected parallel circuit comprising a resistor and a diode.

* * * * *